United States Patent
Tsi-Shi

(10) Patent No.: US 8,169,589 B2
(45) Date of Patent: May 1, 2012

(54) ADAPTIVE FOCUSING USING LIQUID CRYSTAL ZONE PLATES IN ELECTRO-OPTICAL READERS

(75) Inventor: David Tsi-Shi, Stony Brook, NY (US)

(73) Assignee: Symbol Technologies, Inc., Holtsville, NY (US)

(*) Notice: Subject to any disclaimer, the term of this patent is extended or adjusted under 35 U.S.C. 154(b) by 863 days.

(21) Appl. No.: 12/077,230

(22) Filed: Mar. 18, 2008

(65) Prior Publication Data

US 2009/0237575 A1    Sep. 24, 2009

(51) Int. Cl.
*G02F 1/13* (2006.01)
*C09K 19/02* (2006.01)

(52) U.S. Cl. ............ 349/200; 349/1; 349/177; 349/199; 235/462.23; 235/472.01

(58) Field of Classification Search .............. 349/1, 200, 349/177, 199; 235/462.23, 472.01
See application file for complete search history.

(56) References Cited

U.S. PATENT DOCUMENTS

| | | | |
|---|---|---|---|
| 4,190,330 A | 2/1980 | Berreman | |
| 4,613,895 A | 9/1986 | Burkey et al. | |
| 4,794,239 A | 12/1988 | Allais | |
| 5,304,786 A | 4/1994 | Pavlidis et al. | |
| 5,305,731 A | 4/1994 | Buchholtz | |
| 5,703,349 A | 12/1997 | Meyerson et al. | |
| 6,768,536 B2* | 7/2004 | Okuwaki et al. | 349/200 |
| 6,859,333 B1* | 2/2005 | Ren et al. | 359/721 |
| 7,201,318 B2 | 4/2007 | Craen et al. | |
| 7,264,162 B2* | 9/2007 | Barkan | 235/454 |

* cited by examiner

Primary Examiner — Nathanael R Briggs
(74) Attorney, Agent, or Firm — Nong-Qiang Fan

(57) ABSTRACT

Working range and beam cross-section are adjusted in an electro-optical reader for reading indicia by applying voltages to electrodes in one or more liquid crystal zone plates in which the index of refraction is changed in different regions of each zone plate.

24 Claims, 3 Drawing Sheets

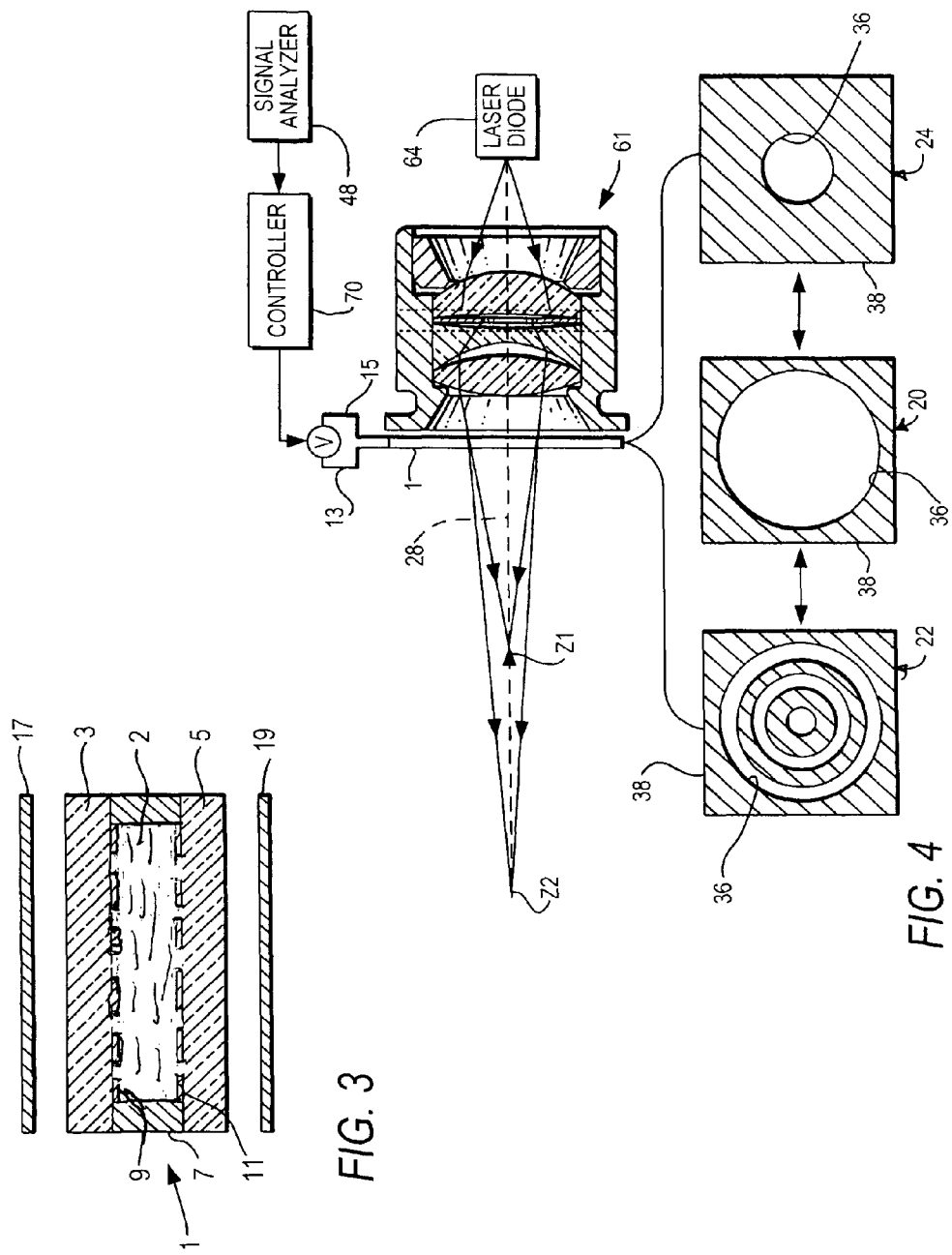

ADAPTIVE FOCUSING USING LIQUID CRYSTAL ZONE PLATES IN ELECTRO-OPTICAL READERS

DESCRIPTION OF THE RELATED ART

Solid-state imaging systems or imaging readers, as well as moving laser beam readers or laser scanners, have both been used to electro-optically read one-dimensional bar code symbols, particularly of the Universal Product Code (UPC) type, each having a row of bars and spaces spaced apart along one direction, and two-dimensional symbols, such as Code 49, which introduced the concept of vertically stacking a plurality of rows of bar and space patterns in a single symbol. The structure of Code 49 is described in U.S. Pat. No. 4,794,239. Another two-dimensional code structure for increasing the amount of data that can be represented or stored on a given amount of surface area is known as PDF417 and is described in U.S. Pat. No. 5,304,786.

The imaging reader includes a solid-state imager or sensor having an array of cells or photosensors, which correspond to image elements or pixels in a field of view of the imager, and an imaging lens assembly for capturing return light scattered and/or reflected from the symbol being imaged. Such an imager may include a one- or two-dimensional charge coupled device (CCD) or a complementary metal oxide semiconductor (CMOS) device and associated circuits for producing electronic signals corresponding to a one- or two-dimensional array of pixel information over the field of view.

It is therefore known to use the imager for capturing a monochrome image of the symbol as, for example, disclosed in U.S. Pat. No. 5,703,349. It is also known to use the imager with multiple buried channels for capturing a full color image of the symbol as, for example, disclosed in U.S. Pat. No. 4,613,895. It is common to provide a two-dimensional CCD with a 640×480 resolution commonly found in VGA monitors, although other resolution sizes are possible.

Laser beam readers generally include a laser for emitting a laser beam, a focusing lens assembly for focusing the laser beam to form a beam spot having a certain size at a predetermined working distance, a scan component for repetitively scanning the beam spot across a target symbol in a scan pattern, for example, a line or a series of lines across the target symbol, a photodetector for detecting light reflected and/or scattered from the symbol and for converting the detected light into an analog electrical signal, and signal processing circuitry including a digitizer for digitizing the analog signal, and a microprocessor for decoding the digitized signal based upon a specific symbology used for the symbol.

It is desirable that the symbol be capable of being imaged or scanned over an extended range of working distances relative to the reader. It is conventional to move one or more lenses in the imaging lens assembly and, in turn, to move imaging planes at which the symbol is located and imaged between a near position close to the reader and a far position further away from the reader. It is also conventional to move one or more lenses in the focusing lens assembly and, in turn, to move the focus of the laser beam between the near and far positions. This lens movement is typically performed mechanically. This is disadvantageous for several reasons. First, the mechanical movement generates vibrations that are propagated through the reader to a user's hand in a handheld mode of operation, and may also generate dust to obscure the lens assembly. Moreover, the vibrations can generate objectionable, annoying, audible hum. In addition, the lens movement requires a drive that, in turn, consumes electrical power, is expensive and slow, can be unreliable, occupies space and increases the overall weight, size and complexity of the reader.

To avoid such mechanical movement, a variable focus liquid lens based on an electro-wetting effect has been proposed in U.S. Pat. No. 7,201,318 and No. 7,264,162 for use in both imaging and laser beam electro-optical readers, in which an electrical voltage is applied to the liquid lens to change an optical property, e.g., a focal length, thereof in accordance with a transfer function that resembles a parabola when a reciprocal of focal length is plotted against the applied voltage. The liquid lens, however, has an unpredictable, nonlinear, curved transfer function and, in practice, exhibits a hysteresis property, in which the transfer function for increasing applied voltages is different from the transfer function for decreasing applied voltages. Also, the transfer function is distorted by ambient temperature, in that the transfer function at colder temperatures is different from that at warmer temperatures.

It has further been proposed, for example, in U.S. Pat. No. 4,190,330, No. 5,305,731, and No. 6,859,333 to achieve variable focusing liquid crystal (LC) materials and cells of the type used in optical displays. However, the known LC cells are not entirely uniform or homogeneous and undesirably scatter light, thereby producing a non-uniform optical response.

SUMMARY OF THE INVENTION

One feature of this invention resides, briefly stated, in an arrangement for, and a method of, scanning a target, such as one- and/or two-dimensional bar code symbols, as well as non-symbols. The arrangement includes an optical assembly through which light passes along an optical path. The optical assembly includes a liquid crystal (LC) zone plate having a pair of light-transmissive, electrically conductive electrodes and a nematic LC layer between the electrodes. The LC layer has a changeable optical index of refraction. The arrangement further includes a controller for applying a voltage across the electrodes to change the index of refraction of the LC layer, and for optically modifying the light passing through the LC zone plate to have different optical characteristics.

In the case of a moving beam reader, a light source, such as a laser, is operative for emitting the light passing through the LC zone plate to the target for reflection therefrom. The different optical characteristics are different focal planes spaced apart along the optical path at different working distances relative to the LC zone plate. Preferably, the LC zone plate has a plurality of regions of the LC layer, and the controller changes the index of refraction of each region of the LC layer to focus the light at the different focal planes. In the case of an imaging reader, a solid-state sensor or imager, such as a CCD or a CMOS array, is operative for receiving the light passing through the LC zone plate from the target. The different optical characteristics are different imaging planes spaced apart along the optical path at different working distances relative to the LC zone plate. Preferably, the LC zone plate has a plurality of regions of the LC layer, and the controller changes the index of refraction of each region of the LC layer to image the light at the different imaging planes.

In a preferred embodiment, the controller is operative for continuously applying the voltage as a periodic voltage during scanning. An analyzer is advantageously provided for determining whether the target was a symbol that was successfully electro-optically read, and the controller is operative for applying the voltage upon a determination that the symbol was not successfully electro-optically read.

In the preferred embodiment, the electrodes of the LC zone plate are preferably planar and disposed on substrates located at opposite sides of the LC layer. The LC layer has a generally uniform dimension between the electrodes. Preferably, the optical assembly includes a plurality of fixed focal lenses spaced along the optical path apart from, or integral with, the LC zone plate, and a fixed aperture stop spaced along the optical path apart from, or integral with, the LC zone plate.

The optical assembly may also include another LC zone plate having a changeable optical index of refraction along the optical path, in which case the controller is operative for changing each index of refraction, and for optically modifying the light passing through each LC zone plate to have different optical characteristics. In the case of the moving beam reader, the light passing through one of the LC zone plates may focus the light beam at one of the working distances along the optical path, and the light passing through the other of the LC zone plates may have a selected cross-section at the one working distance.

As previously mentioned, the LC zone plate preferably has a plurality of regions of the LC layer. In another feature of this invention, the controller changes the index of refraction of each region of the LC layer to vary a size of an aperture through which the light passes along the optical path, thereby serving as an iris control for controlling the cross-section, or the magnitude of power, of the transmitted light, as well as controlling the depth of focus of the transmitted light. The changing between different focal planes, different imaging planes, and/or the changing of the light cross-section is rapidly performed without mechanically or physically moving solid lenses, thereby decreasing the noise and vibration and dust in such readers, as well as the size, weight, power and volume requirements. The LC zone plate described herein will not wear out over time and can be employed in the above-described readers, as well as in cameras, especially those used in portable telephones.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 3 is a diagrammatic view of an LC zone plate for use in the reader of FIG. 1 or FIG. 2 in accordance with this invention;

FIG. 4 is a diagrammatic view of an arrangement using the LC zone plate in the reader of FIG. 1;

DETAILED DESCRIPTION OF THE PREFERRED EMBODIMENTS

Figure 1:
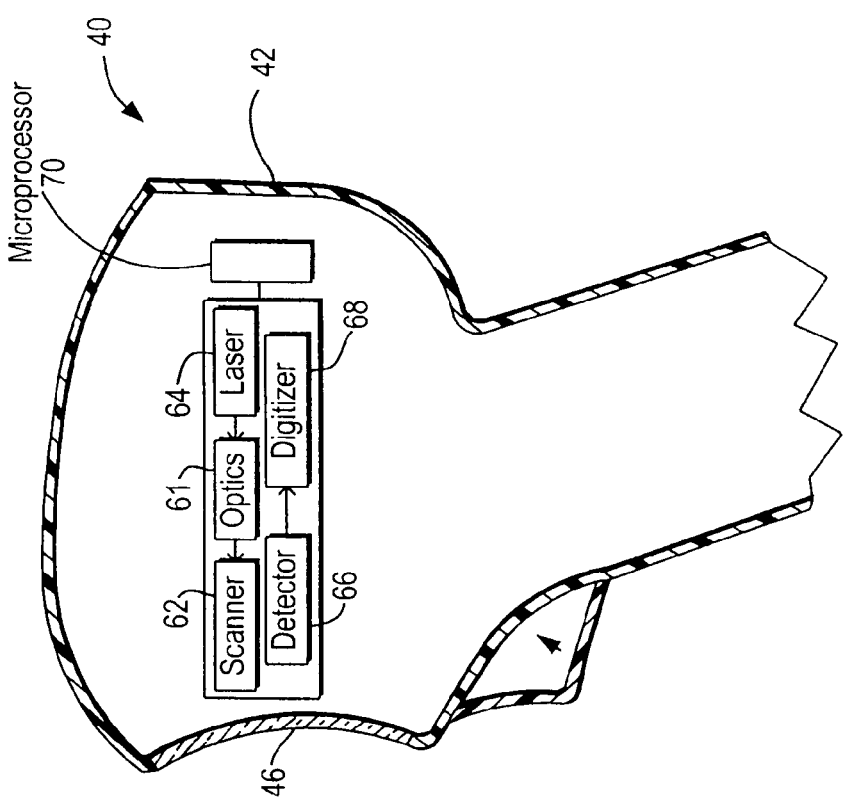
FIG. 1 is a schematic diagram of a handheld moving laser beam reader for reading a bar code symbol in accordance with the prior art.

FIG. 1 depicts a conventional moving laser beam reader 40 for electro-optically reading indicia, such as a symbol, that may use, and benefit from, the present invention. The beam reader 40 includes a scanner 62 in a housing 42 for scanning an outgoing laser beam from a laser 64 and/or a field of view of a light detector or photodiode 66 in a scan pattern, typically comprised of one or more scan lines, through a window 46 across the symbol for reflection or scattering therefrom as return light detected by the photodiode 66 during reading. The beam reader 40 also includes a focusing lens assembly or optics 61 for optically modifying the outgoing laser beam to have a large depth of field, and a digitizer 68 for converting an electrical analog signal generated by the detector 66 from the return light into a digital signal for subsequent decoding by a microprocessor or controller 70 into data indicative of the symbol being read.

Figure 2:
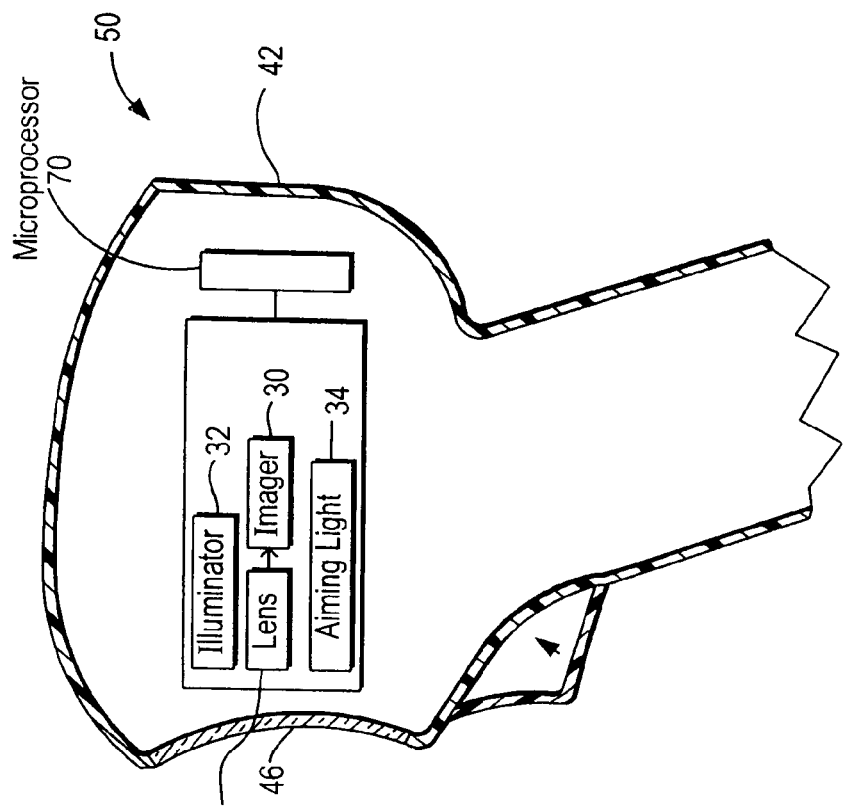
FIG. 2 is a schematic diagram of a handheld imaging reader for imaging a target in accordance with the prior art.

FIG. 2 depicts a conventional imaging reader 50 for imaging targets, such as indicia or symbols to be electro-optically read, as well as non-symbols, which may use, and benefit from, the present invention. The imaging reader 50 includes a one- or two-dimensional, solid-state imager 30, preferably a CCD or a CMOS array, mounted in the housing 42. The imager 30 has an array of image sensors operative, together with an imaging lens assembly 31, for capturing return light reflected and/or scattered from the target through the window 46 during the imaging to produce an electrical signal indicative of a captured image for subsequent decoding by the controller 70 into data indicative of the symbol being read, or into a picture of the target.

When the reader 50 is operated in low light or dark ambient environments, the imaging reader 50 includes an illuminator 32 for illuminating the target during the imaging with illumination light directed from an illumination light source through the window 46. Thus, the return light may be derived from the illumination light and/or ambient light. The illumination light source comprises one or more light emitting diodes (LEDs). An aiming light generator 34 may also be provided for projecting an aiming light pattern or mark on the target prior to imaging.

In operation of the imaging reader 50, the controller 70 sends a command signal to pulse the illuminator LEDs 32 for a short time period, say 500 microseconds or less, and energizes the imager 30 during an exposure time period of a frame to collect light from the target during said time period. A typical array needs about 33 milliseconds to read the entire target image and operates at a frame rate of about 30 frames per second. The array may have on the order of one million addressable image sensors.

In accordance with this invention, the focusing lens assembly 61 or the imaging lens assembly 31 is configured with a liquid crystal (LC) zone plate 1, as shown in isolation in FIG. 3. The zone plate 1 comprises a twisted nematic LC layer 2 contained between two parallel generally planar substrates 3, 5, preferably constituted of glass or a polymer, separated by spacers 7. Each substrate 3, 5 carries on its surface adjacent to the LC layer 2 a respective optically transparent, electrically conductive, electrode structure 9, 11, arranged in any desired pattern, preferably each electrode structure being in the form of a series of concentric rings of indium tin oxide. Respective leads 13, 15 (see FIGS. 4-5) are provided to each series of rings, for connecting each ring to a voltage source (V). The zone plate 1 also includes a pair of crossed polarizers 17, 19 at opposite sides of the LC layer 2.

The two substrates 3, 5 are coated with alignment layers (not shown). Alignment layers are used on the opposing surfaces of the substrates 3, 5 adjacent to the LC layer 2 to produce a homogeneous alignment. Persons skilled in the art may select from a wide variety of materials, usually polyimides, including, but not limited to, polyvinyl alcohol (PVA)

for use as alignment layers on the substrates. The LC layer 2 is injected into a cell between the substrates 3, 5.

The LC layer 2 has at least one semi-ordered, mesomorphic or nematic phase, in addition to a solid phase and an isotropic liquid phase. Molecules of the nematic LC layer typically are rod-shaped with the average direction of the long axes of the rod-shaped molecules being designated as the director, or may be disk-shaped with the direction perpendicular to the disk-shaped molecules being designated as the director. The nematic phase is characterized in that the directors are aligned in a preferred direction.

Birefringence in nematic LC materials is most readily described in terms of a splitting of incoming light entering the LC layer into two perpendicularly polarized rays called the ordinary ray and the extraordinary ray. A variation in a refractive index of the LC layer 2 with respect to the extraordinary ray is effected by varying the angle between the directors relative to the direction of the incoming light. Such tilting of the directors in the LC layer is produced by varying the strength of an electric or magnetic field across the LC layer 2. The directors typically tend to align themselves generally parallel to the direction of the electric or magnetic field. There is a threshold field strength below which the directors do not appreciably respond to the applied field and above which they respond monotonically as the field strength increases until realignment in response to the field reaches saturation.

Figures 5, 6:
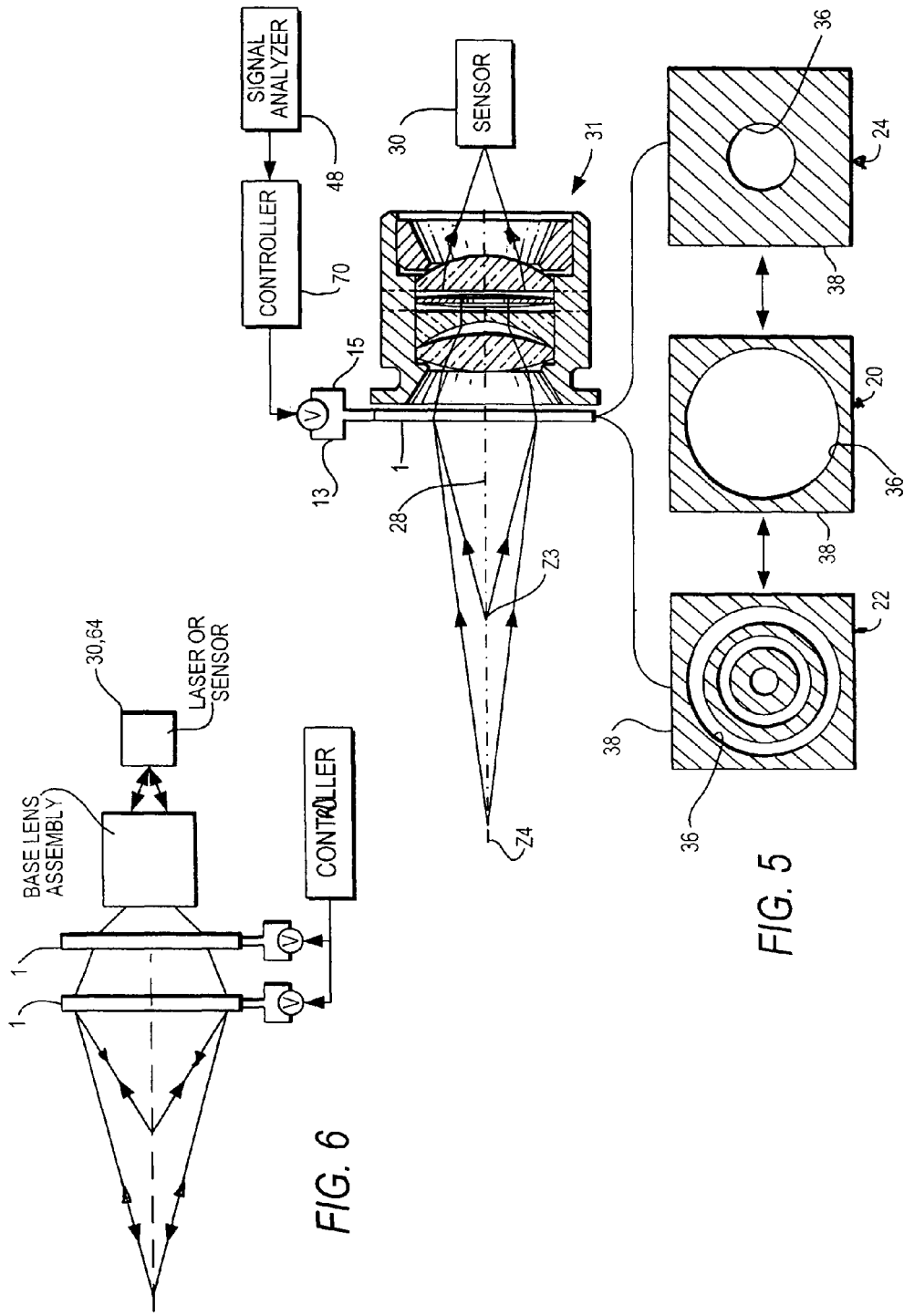
FIG. 5 is a diagrammatic view of an arrangement using the LC zone plate in the reader of FIG. 2.
FIG. 6 is a diagrammatic view of an arrangement using two LC zone plates in the reader of FIG. 1 or FIG. 2 in accordance with this invention.

The refractive index of the LC layer 2 changes in response to a change of field strength to produce a variation of optical properties, e.g., focal length, in the focusing lens assembly 61 in the beam reader of FIG. 4, or the imaging lens assembly 31 in the imaging reader of FIG. 5. When a voltage V is applied across the electrodes 9, 11, the electric field will produce a centro-symmetrical gradient distribution of refractive index "n" within the LC layer 2, in which voltage-dependent gradient refractive index profiles extend across the LC layer.

The LC layer 2 causes light to be modified, e.g., focused or imaged, when a suitable voltage is applied across the electrodes. When there is no applied voltage, the LC layer is uniform; thus, either no or a first predetermined focusing or imaging effect occurs. As the applied voltage increases gradually, the non-uniform electric field causes different degrees of reorientation to the LC directors. As a result, a gradient refractive index profile is formed. The light passing through the LC layer 2 is therefore focused or imaged to achieve a different second predetermined effect. If the applied voltage is much higher than a threshold voltage of the LC layer, then all the LC directors will be aligned generally perpendicular to the substrates. Under such a condition, the gradient refractive index is flat and the focusing or imaging effect is non-existent.

Turning to FIG. 4, the light source 64 of FIG. 1 is shown as a laser diode for emitting a laser beam. A change in voltage across the electrodes 9, 11 of the LC zone plate 1 is responsible for changing the index of refraction and for varying the focal point of the laser beam between a close-in position Z1 and a far-out position Z2 arranged along an optical path 28. A symbol can be read at, and anywhere between, these end-limiting positions, thereby improving the working range of the moving beam reader.

The voltage is preferably periodic, for example, a square wave drive voltage. The square wave is easily created with a variable duty cycle by the controller 70 having a built-in pulse width modulator circuit. The drive voltage could also be a sinusoidal or a triangular wave signal, in which case, the amplitude of the voltage controls the focal length and the working distance. The square wave does not require a voltage as high as the sinusoidal wave for a given change in focal length. When a square wave is used, focal length changes are achieved by varying the duty cycle. When a sinusoidal wave is used, focal length changes are obtained by varying the drive voltage amplitude. The amplitude or the duty cycle can be changed in discrete steps (digital manner) or continuously (analog manner) by the microprocessor or controller 70. The voltage could also be different magnitudes of constant DC voltages.

In the arrangement of FIG. 4, during reading, the laser beam is being scanned by the scanner 62 across focal planes generally transversely of the optical path or axis 28. The controller 70 may operate to apply the periodic voltage to the LC zone plate 1 at all times, or at selected times. Thus, the voltage can be applied for each scan, or for every other scan, etc. The voltage can be applied not only during scanning, but even afterward. The voltage can be initiated at the pull of a trigger, or only after a symbol has been detected. The voltage can be applied automatically, or only after a signal analyzer 48, preferably another microprocessor, has determined that the symbol being scanned has not yet been successfully decoded and read.

For suitable ring widths and ring spacings for the patterned electrodes 9, 11, the zone plate 1 will act as a spherical lens and form annular light-transmissive zones 36 and annular light-nontransmissive zones 38, as shown in the patterns 20, 22, 24 of FIG. 4. Thus, if the electrode structure ring widths and spacings are such that the light path from the source 64 to the target or symbol differs by half the wavelength of the light emitted by the source 64 in adjacent concentric zones across the zone plate 1, then the wavefront of the light transmitted through the zone plate will be divided into Fresnel zones. When a voltage is applied between the electrode structures 9, 11, the combination of the twisted nematic liquid crystal layer 2 and the polarizers 17, 19 will cause the zone plate 1 to be nontransmissive to the light in alternate Fresnel zones defined by the coincidence of the electrode structures 9, 11.

Hence, a zone plate lens is formed in which the light wave transmitted through the transmissive zones 36 act to reinforce each other, while the nontransmissive zones 38 block the out-of-phase light waves. Pattern 20, for example, is generated when no or a low voltage is applied across the electrode structures 9, 11 of the zone plate 1 to focus the laser beam at distance Z1, whereas pattern 22 is obtained when a higher voltage is applied across the electrode structures 9, 11 of the zone plate 1 to focus the laser beam at distance Z2. Pattern 24 is useful, especially when compared to pattern 20, to serve as an iris control or variable aperture stop. Pattern 24 constricts the cross-section of the light passing therethrough, while pattern 20 enlarges the cross-section. This constricting-enlarging action not only controls the power in the transmitted light, but also the depth of focus.

FIG. 5 is analogous to FIG. 4, except that it depicts an imaging reader having the imager or sensor 30, preferably a CCD or CMOS array with mutually orthogonal rows and columns of photocells, for imaging the symbol or target located at, or anywhere between, the imaging planes Z3 and Z4 arranged along the optical path 28, thereby providing the imager with an extended working range in which to collect light from the symbol. As before, the change in voltage when a periodic voltage is applied across the electrode structures 9, 11 of the LC zone plate 1 enables the extended working range to be achieved.

Each lens assembly 31, 61 may also have a base lens assembly comprising a plurality of fixed convex and concave lenses 72, 74, 76 (see FIG. 4 or 5) arranged as a triplet and spaced from the LC zone plate 1, and an aperture stop 78 which can be positioned anywhere in the optical path 28, especially within the base lens assembly. Each fixed lens 72, 74, 76 may be separate from, or integral with, the LC zone plate 1. The aperture stop 78 is operative to maintain a constant beam diameter for the light passing therethrough. The base lens assembly assists in minimizing any kind of aberrations, for example, chromatic aberrations.

For one-dimensional symbols, a more elliptical or elongated beam cross-section is desired. For two-dimensional symbols, a more circular beam cross-section is desired. By applying a periodic voltage, the LC zone plate 1 can optically modify the cross-section of the beam to different cross-sections. These shape changes can occur continuously or in stepwise manner and are especially useful in reading damaged or poorly printed symbols, thereby improving reader performance.

It will be seen that the change in focus and/or the change in beam cross-section is accomplished without mechanical motion of any solid lenses.

As shown schematically in FIG. 6, more than one LC zone plate 1 can be arranged in series along the optical path 28. One LC zone plate 1 can be used for focus variation, another can be used to change the beam cross-section and/or the magnification (i.e., the zoom effect). Multiple zone plates 1 can also be used to reduce astigmatism.

As described above in connection with FIG. 4, varying the focal length will cause the beam spot or waist, i.e., the point where the laser beam has a minimum diameter in cross-section, to be moved between the different working range positions Z1 and Z2. When the focal length is varied, the size of the waist will change also. As the focal length is adjusted to move the waist outwards toward Z2, the waist increases in diameter, and when the waist is moved inwards toward Z1, the waist shrinks in diameter. As a result, resolution decreases as the waist is moved outwards, thereby resulting in a limitation in the capability of the reader to read high density symbols at far-out distances. On the other hand, it is sometimes desirable to scan with a large-sized waist at close-in distances, especially for reading damaged or low contrast symbols, because the large waist reduces speckle noise and reduces resolution making it easier for the reader to ignore printing defects.

The dual zone plate system of FIG. 6 enables the first LC zone plate to change the diameter of the waist where it is incident on the second LC zone plate. By controlling the waist diameter on the second LC zone plate, it is possible to maintain a constant waist size as the waist location is changed. The constant waist size can be large if desired for reading low density, damaged or low contrast symbols, or can be small for reading high density symbols over an extended range. The dual zone plate system can position any beam waist size at any working range distance as may be necessary for any scanning application.

The focal lengths of the two LC zone plates can be controlled by the signal analyzer or microprocessor 48, either independently or simultaneously, in a coordinated manner to produce the desired waist size at the desired working distance. The waist size and/or working distance can be pre-set to optimize the reader for specific applications, or can be controlled by the microprocessor 48 running algorithms that analyze the return signal from the symbol and make adjustments as necessary to optimize the capability of the reader to read the symbol being scanned. Advantageously, the same microprocessor 70 used to decode the symbol is used as the signal analyzer 48. Moreover, the same microprocessor can be used to communicate the decoded data to a remote host computer via a hard-wired or wireless link, e.g., radio frequency or infrared.

In a moving beam scanner, not only can the LC zone plate be employed in the outgoing path toward the indicia to be read, but also the LC zone plate may be employed in the return path along which the reflected light returns to the photodetector 66. The LC zone plate may be positioned in front of the photodetector 66 to control optical automatic gain by changing the amount of the reflected light impinging on the photodetector 66. The dual LC zone plate system can also be used in an imaging reader as shown in FIG. 6.

It will be understood that each of the elements described above, or two or more together, also may find a useful application in other types of constructions differing from the types described above. For example, the dynamic scattering or cholesteric phase-change scattering effects may be used as alternatives to the twisted nematic effect in the zone plate. Also, the patterned arrangement of the electrodes need not be a plurality of concentric circular rings, but could be, for example, a two-dimensional array of mutually orthogonal rows and columns. Amplitude or phase modulation can be used to dynamically change the transmittance or transfer function of the light passing through each zone plate.

While the invention has been illustrated and described as embodied in adaptive focusing one or more liquid crystal zone plates in electro-optical readers, it is not intended to be limited to the details shown, since various modifications and structural changes may be made without departing in any way from the spirit of the present invention. For example, the invention can be employed in cameras, especially for those mounted in portable telephones, due to its compact size and lack of moving lenses.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. An arrangement for scanning a target, comprising:
an optical assembly through which light passes along an optical path, the optical assembly including a liquid crystal (LC) zone plate that comprises two parallel generally planar substrates having light-transmissive planar electrodes in the form of concentric rings on the surfaces thereof and a twisted nematic LC layer between the planar substrates, and wherein pairs of light-transmissive electrodes located at opposite sides of the LC layer maintains generally identical distance, the LC layer having a changeable optical index of refraction; and
a controller for applying a voltage across the electrodes to change the index of refraction of the LC layer, and for optically modifying the light passing through the LC zone plate to have different optical characteristics.

2. The arrangement of claim 1; and a light source for emitting the light passing through the LC zone plate to the target for reflection therefrom; and wherein the different optical characteristics are different focal planes spaced apart along the optical path at different working distances relative to the LC zone plate.

3. The arrangement of claim 1; and a solid-state sensor for receiving the light passing through the LC zone plate from the target; and wherein the different optical characteristics are different imaging planes spaced apart along the optical path at different working distances relative to the LC zone plate.

4. The arrangement of claim 1, and wherein the controller is operative for continuously applying the voltage as a periodic voltage during scanning.

5. The arrangement of claim 1; and an analyzer for determining whether the target was a symbol that was successfully electro-optically read, and wherein the controller is operative for applying the voltage upon a determination that the symbol was not successfully electro-optically read.

6. The arrangement of claim 1, wherein the electrodes are disposed on substrates located at opposite sides of the LC layer, and wherein the LC layer has a generally uniform dimension between the electrodes.

7. The arrangement of claim 1, wherein the optical assembly includes a plurality of fixed focal lenses spaced apart from the LC zone plate along the optical path.

8. The arrangement of claim 1, wherein the optical assembly includes a fixed aperture stop spaced apart from the LC zone plate along the optical path.

9. The arrangement of claim 2, wherein the LC zone plate has a plurality of regions of the LC layer, and wherein the controller changes the index of refraction of each region of the LC layer to focus the light at the different focal planes.

10. The arrangement of claim 3, wherein the LC zone plate has a plurality of regions of the LC layer, and wherein the controller changes the index of refraction of each region of the LC layer to image the light at the different imaging planes.

11. The arrangement of claim 1, wherein the LC zone plate has a plurality of regions of the LC layer, and wherein the controller changes the index of refraction of each region of the LC layer to vary a size of an aperture through which the light passes along the optical path.

12. An arrangement for scanning a target, comprising:
optical means through which light passes along an optical path through a liquid crystal (LC) zone plate that comprises two parallel generally planar substrates having light-transmissive planar electrodes in the form of concentric rings on the surfaces thereof and a twisted nematic LC layer between the planar substrates, and wherein pairs of light-transmissive electrodes located at opposite sides of the LC layer maintains generally identical distance; and
means for changing the index of refraction, and for optically modifying the light passing through the LC zone plate to have different optical characteristics.

13. A method of scanning a target, comprising the steps of:
passing light along an optical path through a liquid crystal (LC) zone plate that comprises two parallel generally planar substrates having light-transmissive planar electrodes in the form of concentric rings on the surfaces thereof and a twisted nematic LC layer between the planar substrates, and wherein pairs of light-transmissive electrodes located at opposite sides of the LC layer maintains generally identical distance; and
changing the index of refraction, and optically modifying the light passing through the LC zone plate to have different optical characteristics.

14. The method of claim 13, and configuring the LC zone plate with a pair of light-transmissive, electrically conductive electrodes and a nematic LC layer between the electrodes, the LC layer having the changeable index of refraction; and wherein the changing step is performed by applying a voltage across the electrodes to change the index of refraction of the LC layer.

15. The method of claim 13; and emitting the light passing through the LC zone plate to the target for reflection therefrom; and wherein the different optical characteristics are different focal planes spaced apart along the optical path at different working distances relative to the LC zone plate.

16. The method of claim 13; and receiving the light passing through the LC zone plate from the target; and wherein the different optical characteristics are different imaging planes spaced apart along the optical path at different working distances relative to the LC zone plate.

17. The method of claim 14, and wherein the changing step is performed by continuously applying the voltage as a periodic voltage during scanning.

18. The method of claim 14; and determining whether the target was a symbol that was successfully electro-optically read, and wherein the changing step is performed by applying the voltage upon a determination that the symbol was not successfully electro-optically read.

19. The method of claim 14, and configuring the electrodes to be generally planar, and disposing the electrodes on substrates located at opposite side of the LC layer, and configuring the LC layer with a generally uniform dimension between the electrodes.

20. The method of claim 13, and spacing a plurality of fixed focal lenses apart from the LC zone plate along the optical path.

21. The method of claim 13, and spacing a fixed aperture stop apart from the LC zone plate along the optical path.

22. The method of claim 15, and configuring the LC zone plate with a plurality of regions of the LC layer, and wherein the changing step is performed by changing the index of refraction of each region of the LC layer to focus the light at the different focal planes.

23. The method of claim 16, and configuring the LC zone plate with a plurality of regions of the LC layer, and wherein the changing step is performed by changing the index of refraction of each region of the LC layer to image the light at the different imaging planes.

24. The method of claim 13, and configuring the LC zone plate with a plurality of regions of the LC layer, and wherein the changing step is performed by changing the index of refraction of each region of the LC layer to vary a size of an aperture through which the light passes along the optical path.

* * * * *

UNITED STATES PATENT AND TRADEMARK OFFICE
CERTIFICATE OF CORRECTION

PATENT NO. : 8,169,589 B2
APPLICATION NO. : 12/077230
DATED : May 1, 2012
INVENTOR(S) : Tsi-Shi

Page 1 of 1

It is certified that error appears in the above-identified patent and that said Letters Patent is hereby corrected as shown below:

In Column 8, Line 57, in Claim 2, delete "claim 1;" and insert -- claim 1, --, therefor.

In Column 8, Line 63, in Claim 3, delete "claim 1;" and insert -- claim 1, --, therefor.

In Column 9, Line 4, in Claim 5, delete "claim 1;" and insert -- claim 1, --, therefor.

In Column 10, Line 11, in Claim 15, delete "claim 13;" and insert -- claim 13, --, therefor.

In Column 10, Line 16, in Claim 16, delete "claim 13;" and insert -- claim 13, --, therefor.

In Column 10, Line 23, in Claim 18, delete "claim 14;" and insert -- claim 14, --, therefor.

Signed and Sealed this
Eighth Day of January, 2013

David J. Kappos
*Director of the United States Patent and Trademark Office*